US012800343B2

(12) United States Patent
Lukarski et al.

(10) Patent No.: US 12,800,343 B2
(45) Date of Patent: Nov. 17, 2026

(54) SYNTHESIZING PROBE DATA FROM OVERHEAD IMAGING DATA

(71) Applicant: Woven by Toyota, Inc., Tokyo (JP)

(72) Inventors: Dimitar H. Lukarski, Sunnyvale, CA (US); Ryan M. Wiesenberg, South Lyon, MI (US)

(73) Assignee: WOVEN BY TOYOTA, INC., Chuo-ku (JP)

( * ) Notice: Subject to any disclaimer, the term of this patent is extended or adjusted under 35 U.S.C. 154(b) by 266 days.

(21) Appl. No.: 18/195,696

(22) Filed: May 10, 2023

(65) Prior Publication Data

US 2024/0377219 A1 Nov. 14, 2024

(51) Int. Cl.
*G01C 21/00* (2006.01)
*G06T 11/00* (2026.01)

(52) U.S. Cl.
CPC ..... *G01C 21/3841* (2020.08); *G01C 21/3815* (2020.08); *G01C 21/3852* (2020.08); *G06T 11/00* (2013.01); *G06T 2210/61* (2013.01)

(58) Field of Classification Search
CPC ............ G01C 21/3841; G01C 21/3815; G01C 21/3852; G06T 11/00; G06T 2210/61
USPC ............................................................ 701/25
See application file for complete search history.

(56) References Cited

U.S. PATENT DOCUMENTS 6,470,265 B1 * 10/2002 Tanaka ............... G01C 21/3852 701/532
8,121,350 B2 2/2012 Klefenz
9,291,463 B2 3/2016 Kenyon
11,487,288 B2 11/2022 Iandola et al.
2004/0218910 A1 11/2004 Chang et al.
2013/0063435 A1 3/2013 Stannard et al.
2018/0349526 A1 * 12/2018 Atsmon ................. G06N 3/045
2019/0271550 A1 9/2019 Breed et al.
2020/0193157 A1 * 6/2020 Soni .................... G06F 18/2163
2020/0302250 A1 9/2020 Chu et al.
2020/0386569 A1 12/2020 Stajner et al.
2020/0401136 A1 * 12/2020 Iandola ............... G06F 18/2148
2021/0012165 A1 1/2021 Jiang
2021/0049412 A1 2/2021 Kesrich et al.
2021/0150893 A1 * 5/2021 Mubarek ............ G01C 21/3844
2021/0247204 A1 8/2021 Nomura et al.
2021/0270630 A1 9/2021 Aota et al.
2022/0237522 A1 7/2022 Kalcher et al.
2022/0309696 A1 * 9/2022 Wang ....................... G06N 3/09
(Continued)

FOREIGN PATENT DOCUMENTS

EP 2462411 B1 6/2012

*Primary Examiner* — Fadey S. Jabr
*Assistant Examiner* — Paula L Schneider
(74) *Attorney, Agent, or Firm* — Christopher G. Darrow; Darrow Mustafa PC

(57) ABSTRACT

Systems, methods, and other embodiments described herein relate to improving the generation and validation of map data by synthesizing probe data. In one embodiment, a method includes acquiring imaging data about a roadway, the imaging data being from a remote source. The method includes encoding the imaging data using a probe model to generate features. The method includes generating, from the features using the probe model, probe data that complements the imaging data for the roadway. The method includes providing the probe data that includes a vehicle trace and detections about attributes of the roadway.

18 Claims, 7 Drawing Sheets

(56) References Cited

U.S. PATENT DOCUMENTS

| | | | | |
|---|---|---|---|---|
| 2023/0195122 | A1* | 6/2023 | Shenfeld | G06V 20/588 701/26 |
| 2024/0185524 | A1* | 6/2024 | McCormack | G06T 7/38 |
| 2024/0344846 | A1* | 10/2024 | Huffman | G01C 21/3804 |

* cited by examiner

SYNTHESIZING PROBE DATA FROM OVERHEAD IMAGING DATA

TECHNICAL FIELD

The subject matter described herein relates, in general, to synthesizing probe data and, more particularly, to processing overhead imaging data using a generative neural network to imitate probe data for a roadway.

BACKGROUND

Vehicles may be equipped with sensors that facilitate perceiving aspects of a surrounding environment. For example, a vehicle may be equipped with one or more cameras, location sensors, and so on to provide information about the vehicle and the surrounding environment. This sensor data can be useful in various circumstances for deriving trace data that provide for mapping roadways at a level of the lane according to inferences about the path traveled by the vehicle. That is, trace data can include a path of the vehicle along a roadway depicted by periodic identifications of a location (e.g., GPS location). However, because generating a map in this way requires the acquisition of trace data for all roadways in a network and may further use not just a single pass but multiple passes through a region, acquiring sufficient information to successfully generate a map may be difficult. That is, in some regions, probe vehicles may be sparse or may not be permitted to collect information due to local laws. Accordingly, using probe data for these areas may not be feasible.

SUMMARY

In one embodiment, example systems and methods relate to a manner of improving the generation and validation of map data by synthesizing probe data from imaging data. As previously noted, probe data may not be available because of limitations on access and/or local laws prohibiting the collection of such data. As such, mapping pipelines that rely on probe data to generate lane-level maps may not function for such locations.

Therefore, in at least one approach, an inventive system synthesizes probe data from available imaging data that is generally comprised of overhead images, such as satellite images. For example, the inventive system may implement a probe model that is a generative neural network. The probe model is able to intake the imaging data and generate encoded features that represent attributes of a roadway depicted therein. The attributes generally include lane markers, road boundaries, crosswalks, and other aspects about the roadway. From the encoded features, the probe model synthesizes probe data to imitate information that would be provided by a vehicle traversing the roadway. The probe data is, for example, comprised of trace data and detections. The trace data defines a path of the vehicle through the environment according to periodic detections of a location of the vehicle according to a GPS location. The detections are perceptions derived from sensor data acquired by the vehicle and can include road boundaries, lane boundaries, and so on.

Accordingly, the inventive system can then use the probe data along with a mapping pipeline to generate a lane-level map of the roadway, which may then be employed by a vehicle to traverse the roadway using automated systems. In a further aspect, the inventive system uses the synthesized probe data to validate existing probe data when available. That is, the inventive system uses an independent source of information in the imaging data to generate the synthesized probe data from which actual probe data can be validated. For example, the system can directly compare the synthesized probe data with the actual probe data to determine correspondence or a lack thereof. When the separate pieces of data do not correspond, then this may indicate a change in the roadway or errors in the actual probe data. In this way, the noted approach provides improvements for both generating maps where probe data is otherwise unavailable and also in relation to the validation of existing data.

In one embodiment, a mapping system for synthesizing probe vehicle trace data is disclosed. The mapping system includes one or more processors and a memory communicably coupled to the one or more processors. The memory stores instructions that, when executed by the one or more processors, cause the one or more processors to acquire imaging data about a roadway, the imaging data being from a remote source. The instructions include instructions to encode the imaging data using a probe model to generate features. The instructions include instructions to generate, from the features using the probe model, probe data that complements the imaging data for the roadway. The instructions include instructions to provide the probe data that includes a vehicle trace and detections about attributes of the roadway.

In one embodiment, a non-transitory computer-readable medium including instructions that, when executed by one or more processors, cause the one or more processors to perform one or more functions is disclosed. The instructions include instructions to acquire imaging data about a roadway, the imaging data being from a remote source. The instructions include instructions to encode the imaging data using a probe model to generate features. The instructions include instructions to generate, from the features using the probe model, probe data that complements the imaging data for the roadway. The instructions include instructions to provide the probe data that includes a vehicle trace and detections about attributes of the roadway.

In one embodiment, a method is disclosed. In one embodiment, the method includes acquiring imaging data about a roadway, the imaging data being from a remote source. The method includes encoding the imaging data using a probe model to generate features. The method includes generating, from the features using the probe model, probe data that complements the imaging data for the roadway. The method includes providing the probe data that includes a vehicle trace and detections about attributes of the roadway.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the generation and validation of map data by synthesizing probe data are disclosed herein. As previously noted, in some circumstances, probe data may not be available because of limitations on access and/or local laws prohibiting the collection of such data. For example, some roadways may experience limited traffic because of being remote or otherwise restricted. As such, a number of probe vehicles that are likely to traverse these roadways is also low, thereby resulting in sparse or no probe data from which to derive a map.

Therefore, in at least one approach, a mapping system synthesizes probe data from available imaging data, which may include overhead images, such as satellite images, and/or other imaging modalities, such as radar, LiDAR, etc. The mapping system may implement a probe model that is a generative neural network. Thus, the probe model, in at least one arrangement, has an encoder-decoder structure and may be an autoencoder or another generative network. The probe model may be a generative adversarial network that trains using a discriminator to assess a quality of synthesized outputs of the probe model. In any case, the probe model is able to intake the imaging data and generate encoded features that represent attributes of a roadway depicted therein. The attributes generally include lane markers, road boundaries, crosswalks, and other aspects about the roadway. From the encoded features, the probe model synthesizes probe data to imitate information that would be provided from a vehicle traversing the roadway. The probe data is, for example, comprised of trace data and detections. The trace data defines a path of the vehicle through the environment according to periodic detections of a location of the vehicle according to a GPS location. The detections are perceptions derived from sensor data acquired by the vehicle and can include road boundaries, lane boundaries, and so on.

Accordingly, the inventive system can then use the probe data along with a mapping pipeline to generate a lane-level map of the roadway, which may then be employed by a vehicle to traverse the roadway using automated systems. In a further aspect, the inventive system uses the synthesized probe data to validate existing probe data when available. That is, the inventive system uses an independent source of information in the imaging data to generate the synthesized probe data from which actual probe data can be validated. For example, the system can directly compare the synthesized probe data with the actual probe data to determine correspondence or a lack thereof. When the separate pieces of data do not correspond, then this may indicate a change in the roadway or errors in the actual probe data. In this way, the noted approach provides improvements for both generating maps where probe data is otherwise unavailable and also in relation to the validation of existing data.

Figure 1:
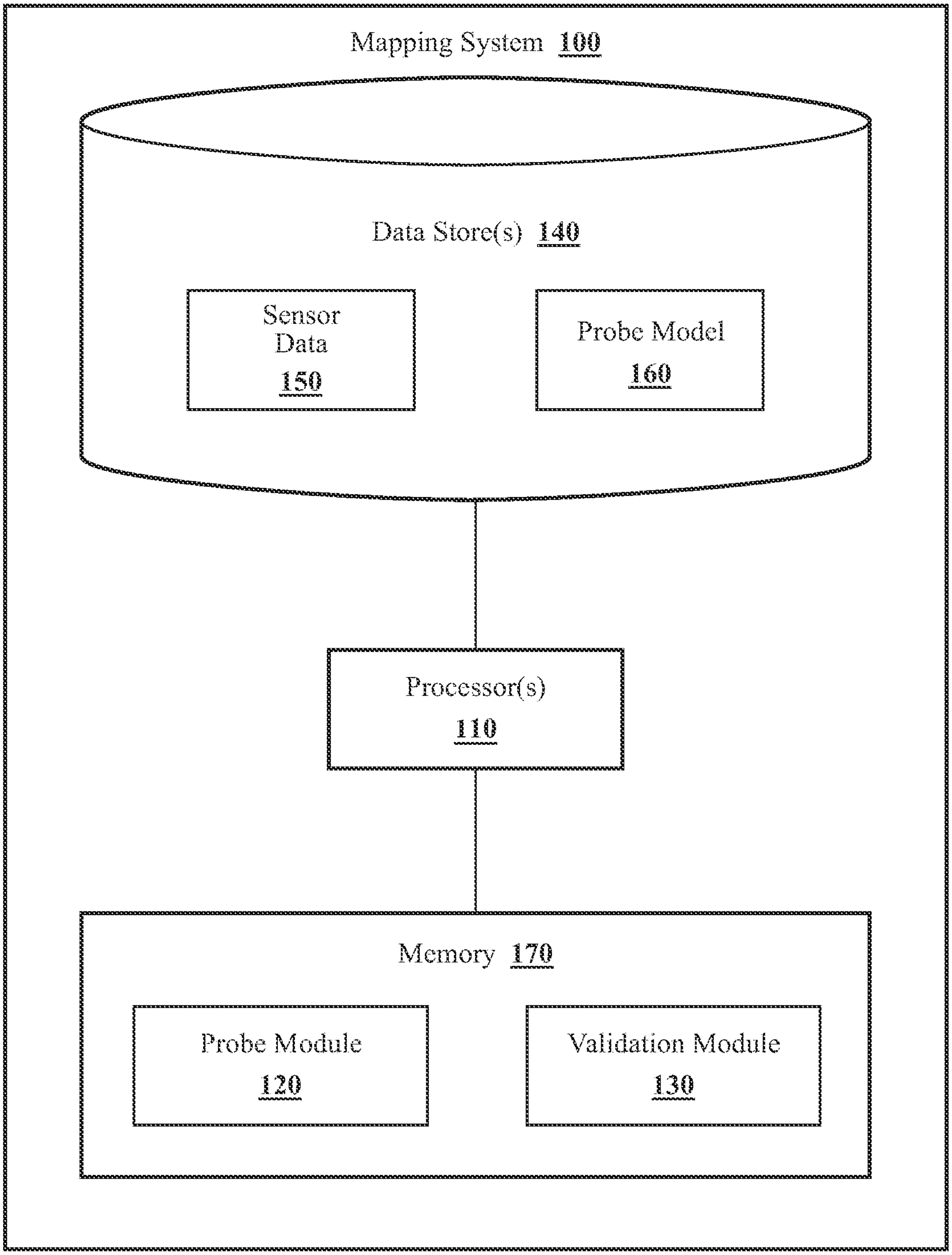
FIG. 1 illustrates one embodiment of a mapping system that is associated with using imaging data to synthesize probe data.

With reference to FIG. 1, one embodiment of a mapping system 100 is further illustrated. The mapping system 100 is shown as including a processor 110, which may be from a vehicle 700 of FIG. 7 or may be associated with a separate computing device, such as a server, cloud-computing system, and so on. Accordingly, the processor 110 may be a part of the mapping system 100, the mapping system 100 may include a separate processor from the processor 710 of the vehicle 700, or the mapping system 100 may access the processor 110 through a data bus or another communication path. In one embodiment, the mapping system 100 includes a memory 170 that stores a probe module 120 and a validation module 130. The memory 170 is a random-access memory (RAM), read-only memory (ROM), a hard-disk drive, a flash memory, or another suitable memory for storing the modules 120 and 130. The modules 120 and 130 are, for example, computer-readable instructions that when executed by the processor 110 cause the processor 110 to perform the various functions disclosed herein. In alternative arrangements, the modules 120 and 130 are independent elements from the memory 170 that are, for example, comprised of hardware elements (e.g., arrangements of logic gates). Thus, the modules 120 and 130 are alternatively ASICs, hardware-based controllers, a composition of logic gates, or another hardware-based solution.

Figure 2:
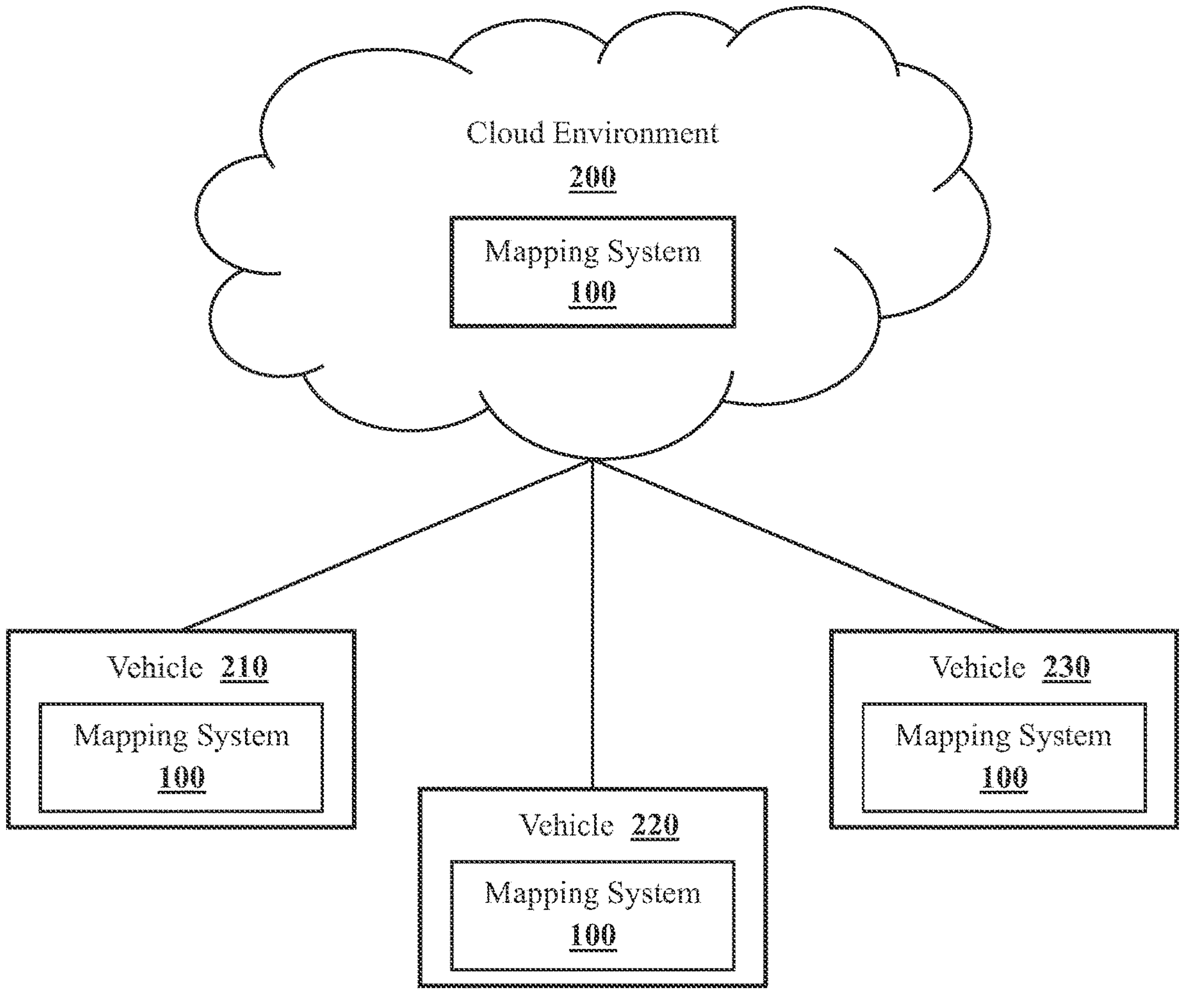
FIG. 2 illustrates one embodiment of the mapping system of FIG. 1 in a cloud-computing environment.

The mapping system 100, as illustrated in FIG. 1, is generally an abstracted form of the mapping system 100 as may be implemented between the vehicle 700 and a cloud-computing environment 200. FIG. 2 illustrates one example of a cloud-computing environment 200 that may be implemented along with the mapping system 100. As illustrated in FIG. 2, the mapping system 100 is embodied at least in part within the cloud-computing environment 200.

In one or more approaches, the cloud environment 200 may facilitate communications between multiple different vehicles to acquire and distribute information between vehicles 210, 220, and 230. Accordingly, as shown, the mapping system 100 may include separate instances within one or more entities of the cloud-based environment 200, such as servers, and also instances within vehicles that function cooperatively to acquire, analyze, and distribute the noted information. In a further aspect, the entities that implement the mapping system 100 within the cloud-based environment 200 may vary beyond transportation-related devices and encompass mobile devices (e.g., smartphones), and other devices that may benefit from the functionality and/or generated maps discussed herein. Thus, the set of entities that function in coordination with the cloud environment 200 may be varied.

In one approach, functionality associated with at least one module of the mapping system 100 is implemented within the vehicle 700, while further functionality is implemented within a cloud-based computing system. Thus, the mapping system 100 may include a local instance at the vehicle 700 and a remote instance that functions within the cloud-based environment.

Moreover, the mapping system 100, as provided for herein, may function in cooperation with a communication system. In one embodiment, the communication system communicates according to one or more communication standards. For example, the communication system can include multiple different antennas/transceivers and/or other hardware elements for communicating at different frequencies and according to respective protocols. The communication system, in one arrangement, communicates via a communication protocol, such as a WiFi, DSRC, V2I, V2V, or another suitable protocol for communicating between the vehicle and other entities in the cloud environment. Moreover, the communication system, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle communicating with various remote devices (e.g., a cloud-based server). In any case, the mapping system 100 can leverage various wireless communication technologies to provide communications to other entities, such as members of the cloud-computing environment.

With continued reference to FIG. 1, in one embodiment, the mapping system 100 includes the data store 140. The data store 140 is, in one embodiment, an electronic data structure stored in the memory 170 or another data storage device that is configured with routines that can be executed by the processor 110 for analyzing stored data, providing stored data, organizing stored data, and so on. Thus, in one embodiment, the data store 140 stores data used by the modules 120 and 130 in executing various functions. In one embodiment, the data store 140 stores the sensor data 150 and the probe model 160.

The probe module 120 generally includes instructions that function to control the processor 110 to acquire data inputs that form the sensor data. In various arrangements, the sensor data 150 may be acquired from separate remote devices, such as satellites, aerial imaging platforms, and so on. For example, the probe module 120 may communicate directly with the collection mechanisms or through a service that acquires the imaging data and then routes the imaging data to the probe module 120, which is stored as the sensor data 150. In further aspects, the probe module 120 may acquire additional data as part of the sensor data 150 and thus may communicate with multiple different sources.

For example, the data inputs can also include, in one embodiment, observations of one or more objects in an environment proximate to the vehicle 700 and/or other aspects about the surroundings. As provided for herein, the probe module 120, in one embodiment, acquires sensor data 150 that includes vehicle location, camera images, and so on. In further arrangements, the probe module 120 acquires the sensor data 150 from further sensors such as a radar 723, a LiDAR 724, and other sensors as may be suitable for identifying aspects of the roadway and surrounding environment. Moreover, while raw sensor information is described, the probe module 120 may further acquire processed data that forms derived observations of the surrounding environment, such as detections of lane markers, road boundaries, signs, traffic signals, and so on.

Accordingly, the probe module 120, in one embodiment, controls the respective sensors to provide the data inputs in the form of the sensor data 150 or at least receives the sensor data via one or more intermediaries therefrom. Moreover, the probe module 120 can undertake various approaches to fuse data from multiple sensors when providing the sensor data 150 and/or from sensor data acquired over a wireless communication link (e.g., v2v) from one or more of the surrounding vehicles. Thus, the sensor data 150, in one embodiment, represents a combination of perceptions acquired from multiple sensors. In general, the sensor data 150 includes at least the imaging data. The imaging data includes overhead images of a roadway that may span a defined region, such as a defined distance, a geopolitical area (e.g., a township, county, state, etc.), an area defined according to a format of the data itself. The imaging data itself generally provides sufficient resolution to resolve features of the roadway, including lane markers. Thus, the imaging data may have a resolution of at least 20 cm. In further aspects, the imaging data includes, additionally or alternatively, radar imaging, LiDAR imaging, or another source of imaging data that provides information about the roadway without using a vehicle to explicitly drive through the region.

When available, the sensor data 150 may further include probe data, which is, for example, comprised of information from a vehicle as outlined previously. Thus, while the primary source of information is the imaging data, the mapping system 100 can also utilize probe data. It should be noted that the probe data is generally not available, but when it is, this data is sparse. That is, the probe data used by the mapping system may be sporadic (e.g., provided in disconnected intervals). In cases where probe data is available, the mapping system 100 may use the approach described herein to validate the probe data, as will be described in greater detail subsequently. However, this is generally described as an alternative to instances where probe data is unavailable or is provided as only sparse data.

The probe data may include a vehicle trace and detections from the vehicle. The vehicle trace is a series of locations of the vehicle as the vehicle traverses the roadway. Thus, the vehicle trace may be represented as a series of points representing the locations connected by line segments. Additionally, the separate points, which are also referred to as frames, may be associated with detections. The detections include information derived from acquired data about the surroundings by the vehicle, such as lane markings, road boundaries, traffic signals, road paint (e.g., crosswalks, lane arrows, etc.), and so on. As such, the sensor data 150 can include a varied set of information depending on availability.

The probe module 120, in one embodiment, includes instructions that cause the processor 110 to initially acquire the sensor data 150 and then, in at least one approach, process the sensor data 150 using the probe model 160. The probe model 160 is, in one configuration, a generative neural network having an encoder-decoder structure, as discussed further subsequently. In any case, the probe model 160 is generally integrated with the probe module 120 and functions to process the sensor data 150 into synthetic probe data. That is, for example, the probe model 160 intakes satellite images of a roadway and produces probe data that predicts what a vehicle would generate if the vehicle traversed the roadway depicted by the satellite image. In this way, the mapping system 100 is able to provide probe data for a region in which probe data is otherwise unavailable and thereby facilitate the use of existing mapping pipelines to generate lane-level map data for the region.

Figure 3:
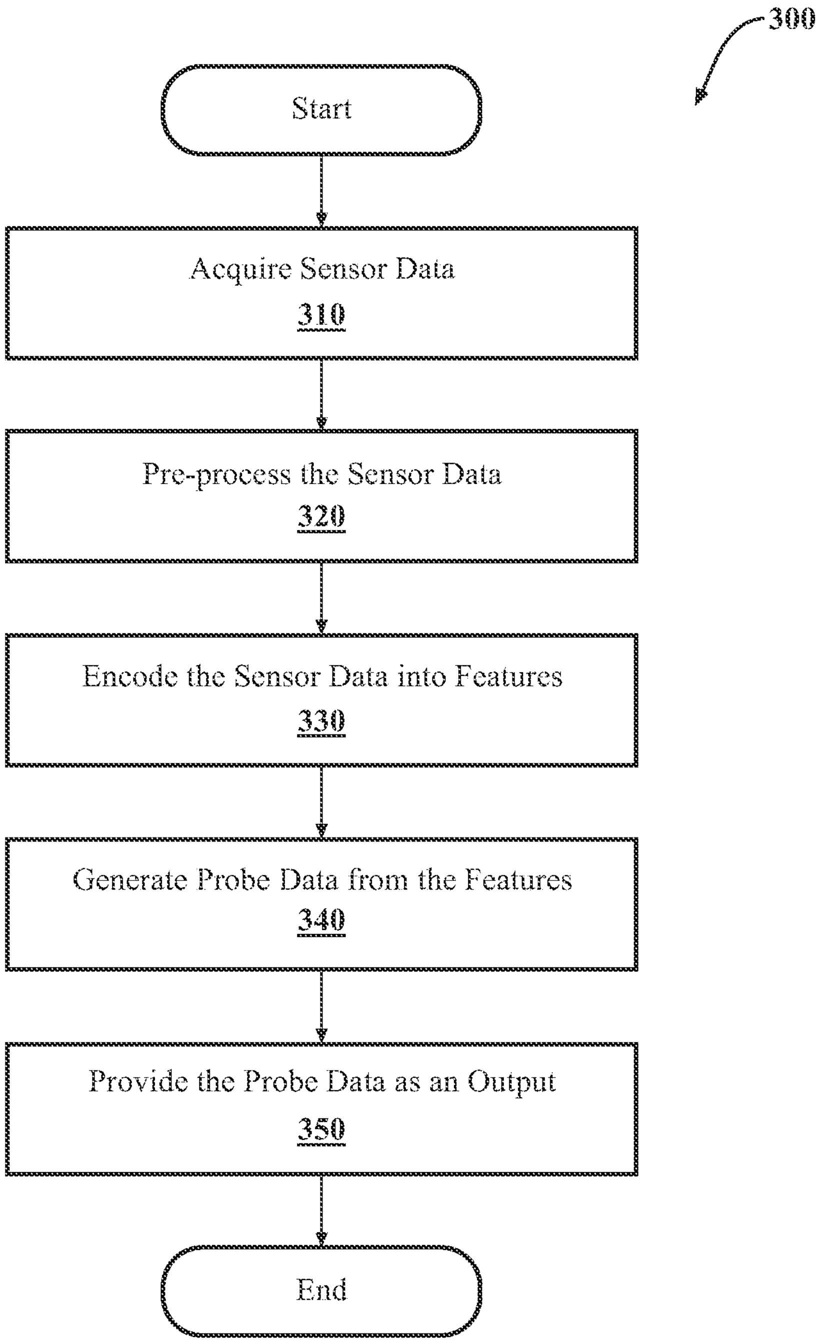
FIG. 3 illustrates a flowchart for one embodiment of a method that is associated with synthesizing probe data using a generative neural network.

Additional aspects of synthesizing probe data will be discussed in relation to FIG. 3. FIG. 3 illustrates a flowchart of a method 300 that is associated with using a generative model to synthesize probe data from images. Method 300 will be discussed from the perspective of the mapping system 100 of FIGS. 1, and 2. While method 300 is discussed in combination with the mapping system 100, it should be appreciated that the method 300 is not limited to being implemented within the mapping system 100 but is instead one example of a system that may implement the method 400.

At 310, the probe module 120 acquires sensor data about a roadway. In one example, the sensor data is embodied as imaging data that may be acquired from a remote source, such as a satellite, an aerial vehicle (e.g., a plane or drone), or from a service that compiles such data from various sources. As mentioned previously, in addition to imaging data, the sensor data 150, in one or more arrangements, can include sparse probe data or, for instances of performing validation, one or more sets of probe data for a region. For purposes of brevity, the discussion of particular aspects of the probe data will not be repeated. In any case, it should be appreciated that the presence of actual probe data is not required in order to produce synthetic probe data using the probe model 160.

At 320, the probe module 120 pre-processes the sensor data 150. Depending on which data is provided and a form of the sensor data 150, the pre-processing may take different forms. For example, when the sensor data 150 is of an acceptable format and is known to be valid, the probe module 120 may skip the pre-processing. However, in other circumstances, the probe module 120 pre-processes the sensor data 150 by validating the data. For example, the probe module 120 determines whether the imaging data is up-to-date and is not older than a defined threshold of time (e.g., six months). In this way, the probe module 120 avoids using outdated information to generate the probe data. Moreover, the probe module 120 can perform further pre-processing functions, such as fusing sparse probe data with the imaging data. For example, the probe module 120 can embed information from the probe data into the imaging data (e.g., an overhead image) in order to provide the information into the probe model 160 in a combined format. The data may be fused using an additional channel that matches spatial relationships or by modifying the image data itself.

At 330, the probe module 120 encodes the sensor data 150 (e.g., imaging data) using the probe model 160 into features. The features are abstract representations of the attributes of the roadway as provided within the sensor data 150. In general, the probe module 120 may apply an encoder of the probe model 160 to reduce a spatial representation of the imaging data into the features. The features may be represented using a vector that maps into a latent space of the probe model 160. In one configuration, the encoder is comprised of convolutional layers and pooling layers that function to transform the sensor data 150 into the features. In any case, the features represent an encoder form of the input.

At 340, the probe module 120 generates the probe data from the features using the probe model 160. In general, the probe data is synthetic or otherwise predicted according to the information with the encoded features and is not from an actual vehicle traversing the roadway. The probe model 160 is, for example, trained to generate the probe data in order to imitate real probe data. Thus, the probe data complements or otherwise matches the imaging data for the roadway. Thus, the probe model 160 provides for the probe module 120 synthesizing the probe data from the features to imitate a vehicle trace and detections of a vehicle as though the vehicle actually traveled along the roadway. As previously described, the probe data itself is comprised of a vehicle trace and detections. The vehicle trace is comprised of discretized locations of the vehicle at defined periods along a path. Thus, the determinations of location (i.e., GPS-derived location) define points at which the vehicle captures its location and are connected by line segments to form the vehicle trace matching a path of the vehicle along the roadway.

The separate points/determinations of the locations are frames that are associated with different detections that the vehicle would generate at those points about the surrounding environment. When generated at the vehicle, the detections involve processing of sensor data about the surrounding environment through various mechanisms within the vehicle (e.g., automated driving modules) that identify attributes of the environment. The identified attributes of the environment include lane lines, road edge boundaries, markings within the road (e.g., crosswalks, arrows, and other markings), traffic signals, signs, etc., which are provided with, for example, absolute geographic positions. When generated by the probe model 160, the detections include the same information but are derived from inferences of information included in the imaging data and associated with the prediction locations of the vehicle trace. In this way, the probe module 120 synthesizes the probe data as virtual data to imitate a vehicle trace and detections as though a vehicle traversed the roadway.

At 350, the probe module 120 provides the probe data. Providing the probe data may involve different functions depending on the implementation. For example, in one approach, the probe module 120 uses the probe data generated at 340 to generate a map of the roadway and subsequently control a vehicle using the map according to one or more automated functions (e.g., autonomous control, ADAS, etc.). Consider that different mapping pipelines may function using different types of data inputs. While some pipelines may use image data, other pipelines use probe data. In general, these pipelines are not situated in a manner as to switch between the types of data used as input. Thus, in locations where the particular type of data is unavailable (e.g., where probe data is unavailable), they may not be able to generate map data, thereby limiting functionality that relies on such map data. Accordingly, the probe module 120 generates the probe data so that the mapping pipeline can generate map data using the probe data as input and provide a same quality of map that includes lane-level information. In this way, the mapping system 100 improves the mapping process and downstream functions of vehicles and other entities that rely on the maps.

Figure 4:
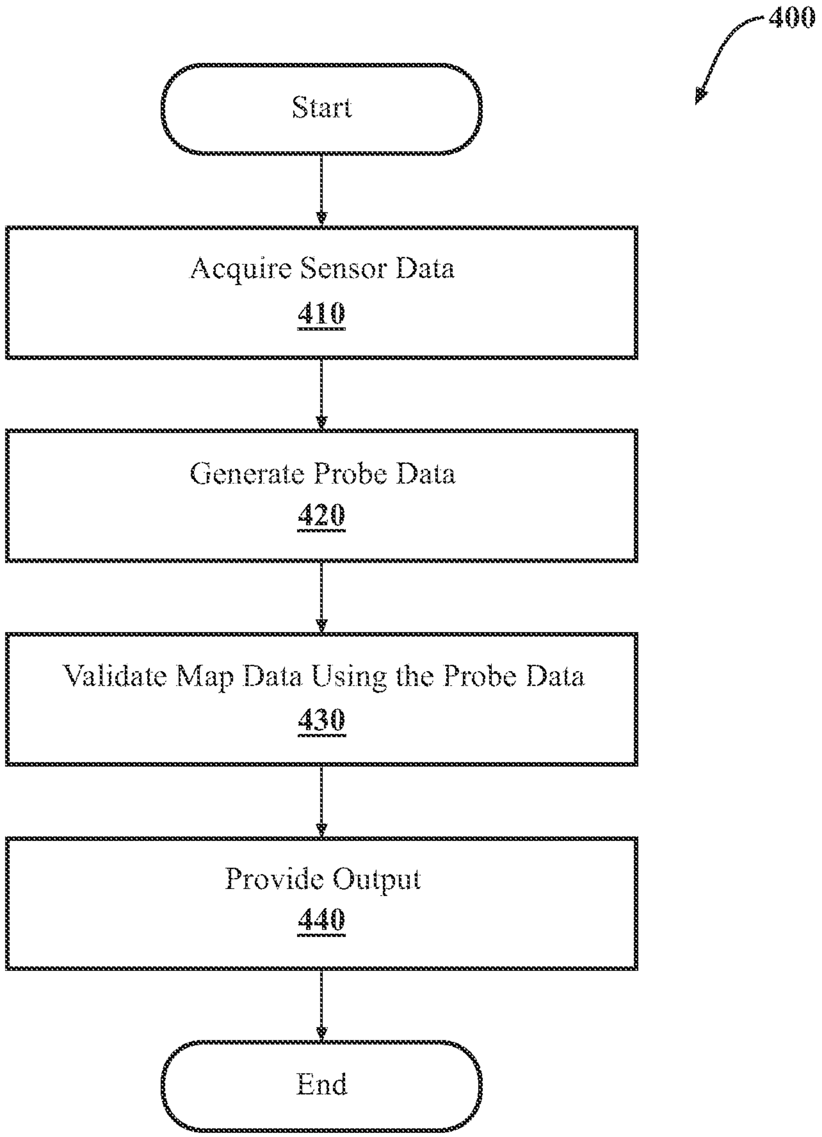
FIG. 4 illustrates a flowchart for one embodiment of a method associated with validating map data using synthesized probe data.

Additional aspects of the mapping system 100 will be discussed in relation to FIG. 4. FIG. 4 illustrates a flowchart of a method 400 that is associated with validating map data. Method 400 will be discussed from the perspective of the mapping system 100 of FIGS. 1, and 2. While method 300 is discussed in combination with the mapping system 100, it should be appreciated that the method 300 is not limited to being implemented within the mapping system 100 but is instead one example of a system that may implement the method 400.

At 410, the validation module 130 acquires sensor data about a roadway. As outlined above, the sensor data includes imaging data of a region, including a roadway, and, in the case of validating information, further includes existing map data. The map data may be a derived map or simply actual probe data collected from one or more vehicles that have traversed the roadway.

At 420, the validation module 130 induces the probe module 120 to generate synthetic probe data according to method 300, as outlined previously. The synthetic probe data is generated from the imaging data and is derived to imitate actual probe data. In the instant case, the synthetic probe data is used as a point of comparison, as described at 430.

At 430, the validation module 130 validates existing map data using the synthetic probe data. It should be appreciated that the process of validating the map data may take different forms depending on the particular implementation but generally involves comparing the synthetic probe data with the map data to determine a variance. Accordingly, in one approach, the validation module 130 compares traces from the two sets of data along with detections to determine when the synthetic and actual probe data align. In further examples, the validation module 130 may first make derivations based on the separate data, such as determinations about lanes, markings, signs, etc., and compare locations between the separate derivations. In this case, comparing derivations of the synthetic data with existing map data as opposed to actual probe data is simplified. In any case, the comparison can identify when actual probe data includes anomalies due to the presence of extended variances (e.g., variances that exceed a defined tolerance of 1 meter). Separately, variances between the synthetic probe data and the map data may indicate changes to the roadway since the prior mapping.

At 440, the validation module 130 outputs the result of the comparison. In one approach, when a variance with existing probe data and synthetic probe data occurs, the validation module 130 flags the existing probe data that varies. This may include simply flagging a section of the data or a source since the variance may be caused by faults in the collecting system. In the case of the detection of potential map changes, the validation module 130 may flag the location on the map for further inspection and/or analysis in order to verify the change prior to committing the change to a published map. In this way, the synthetic probe data provides for further improving mapping and validation of data.

Figure 5:
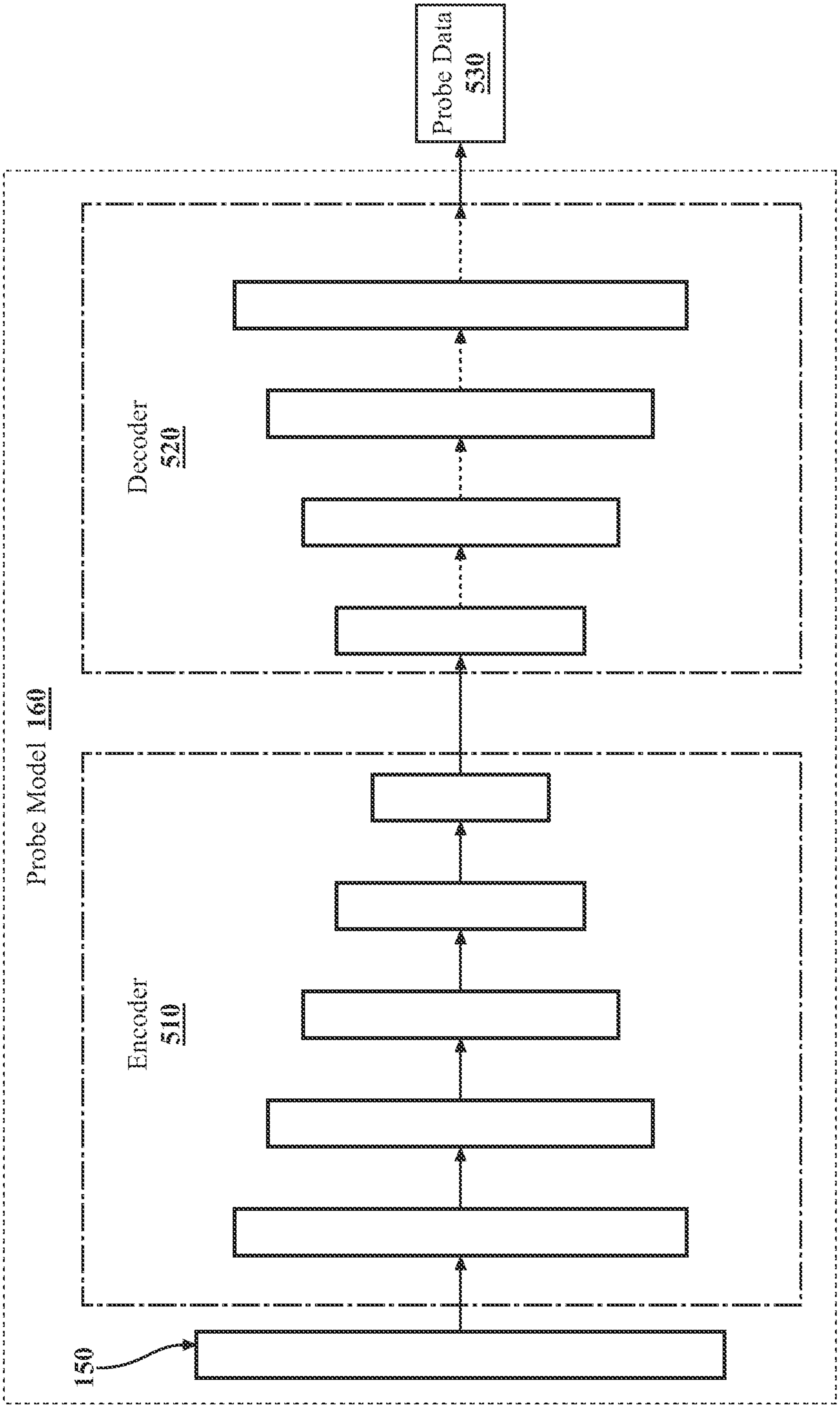
FIG. 5 illustrates one embodiment of a generative neural network.

As further detailed in FIG. 5, the probe model 160 includes an encoder/decoder architecture with an encoder 510 and a decoder 520. The configuration of the encoder 510, in one or more approaches, may include a series of layers that include, for example, convolutional layers, pooling layers, and so on. In general, the encoder 510 includes encoding layers arranged in a series of layers that function to reduce spatial dimensions of the sensor data 150 into representations about embedded states of features included therein. By contrast, the decoder 520 is, for example, comprised of deconvolutional layers that function to predict the output according to the features provided by the encoder 510. In further examples, the probe model 160 may be characterized as an autoencoder or another type of neural network that generally functions to generate an output having spatial characteristics of the probe data. Moreover, while a general form of the probe model 160 is described, the manner in which the probe model 160 is trained may vary according to the particular implementation. In at least one approach, the probe model 160 is a generative adversarial network (GAN). Thus, the probe model 160 may be complemented by a discriminator network that functions to facilitate training of the probe model 160. For example, the discriminator may accept synthetic probe data from the probe model 160 and actual probe data and attempt to determine when the input is real or synthetic. According to this determination, the probe model 160 is adapted to learn how to produce more realistic probe data. In this way, the probe model 160 learns how to generate probe data from imaging data.

Figure 6:
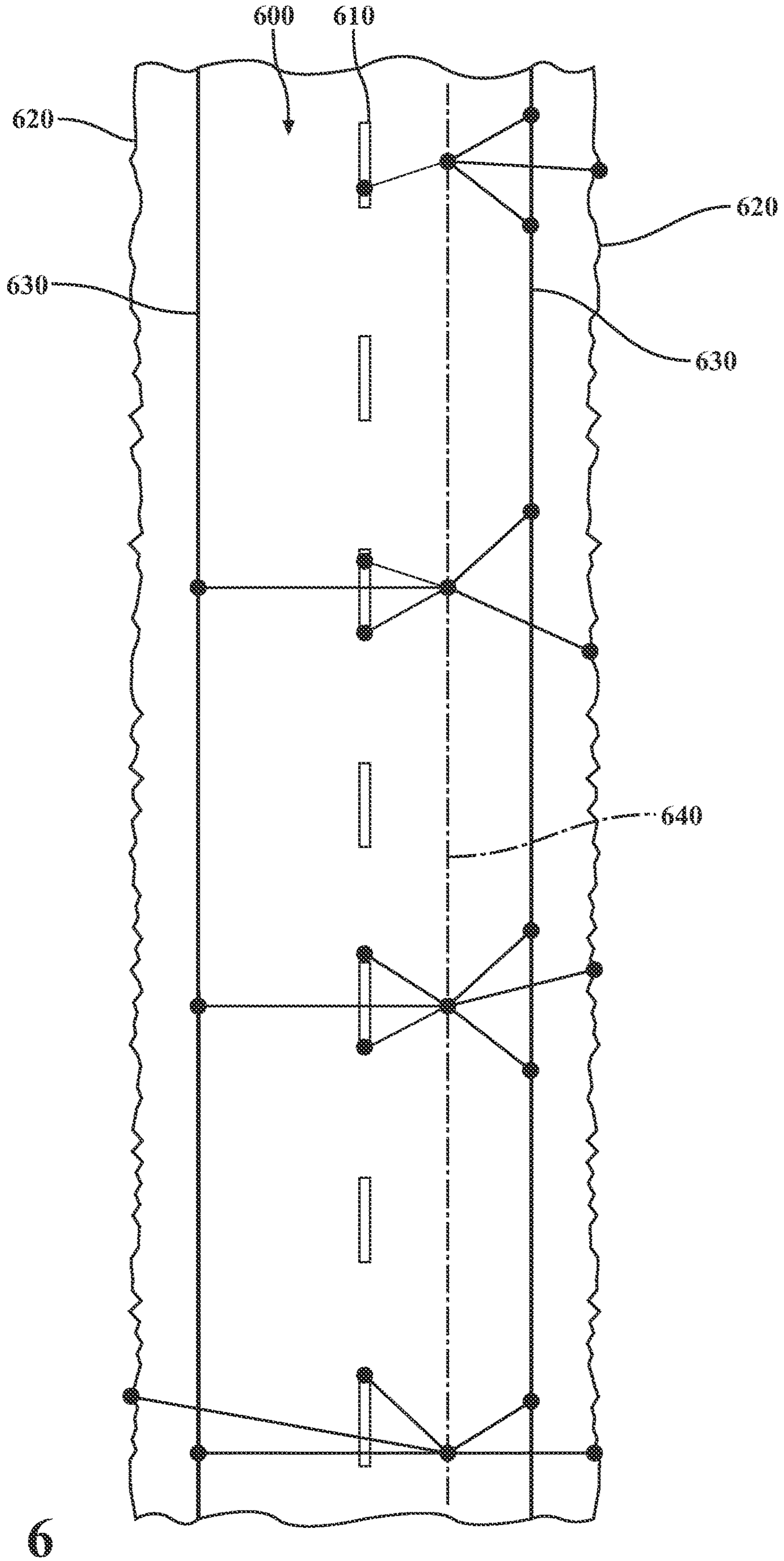
FIG. 6 illustrates an example of probe data and an overhead image of a roadway.

Continuing to FIG. 6, one example of overhead imagery is illustrated along with probe data. For example, as shown in FIG. 6, an image includes a roadway 600. The roadway includes various attributes, such as a dashed centerline 610, road edge boundaries 620, and outside lane lines 630. A vehicle trace 640 is also illustrated that is comprised of a series of points defining determinations from the vehicle about a current location at different times. The points (also referred to as frames) are further associated with detections at the separate times of the attributes noted above. Accordingly, as previously outlined, the mapping system 100 intakes the imaging data and outputs the probe data, including the vehicle trace 640 and the detections.

Figure 7:
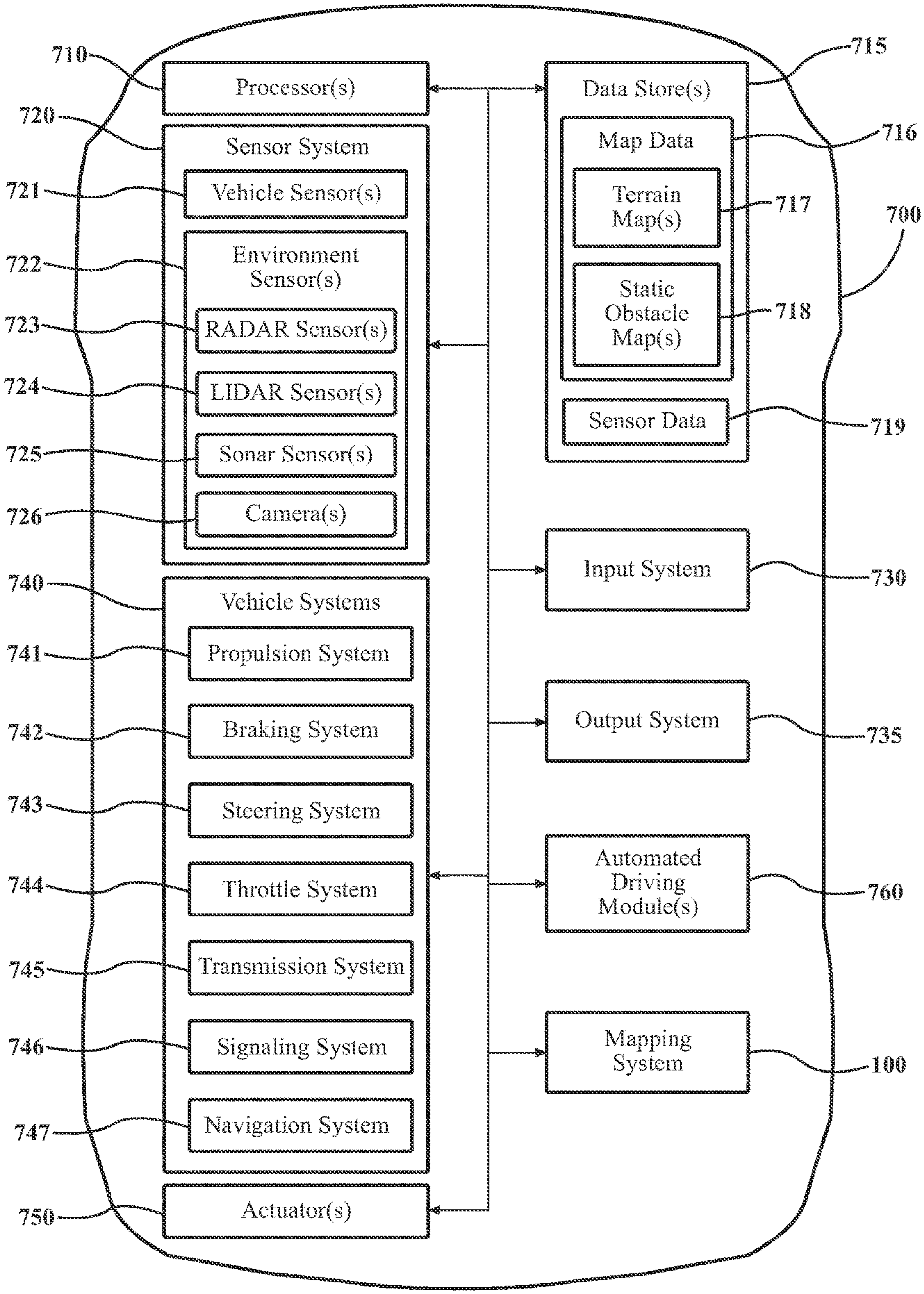
FIG. 7 illustrates one embodiment of a vehicle within which systems and methods disclosed herein may be implemented.

Referring to FIG. 7, an example of a vehicle 700 is illustrated. As used herein, a "vehicle" is any form of transport that may be motorized or otherwise powered. In one or more implementations, the vehicle 700 is an automobile. While arrangements will be described herein with respect to automobiles, it will be understood that embodiments are not limited to automobiles. In some implementations, the vehicle 700 may be a robotic device or a form of transport that, for example, includes sensors to perceive aspects of the surrounding environment, and thus benefits from the functionality discussed herein.

The vehicle 700 also includes various elements. It will be understood that in various embodiments it may not be necessary for the vehicle 700 to have all of the elements shown in FIG. 7. The vehicle 700 can have different combinations of the various elements shown in FIG. 7. Further, the vehicle 700 can have additional elements to those shown in FIG. 7. In some arrangements, the vehicle 700 may be implemented without one or more of the elements shown in FIG. 7. While the various elements are shown as being located within the vehicle 700 in FIG. 7, it will be understood that one or more of these elements can be located external to the vehicle 700. Further, the elements shown may be physically separated by large distances. For example, as discussed, one or more components of the disclosed system can be implemented within a vehicle while further components of the system are implemented within a cloud-computing environment or other system that is remote from the vehicle 700.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 700 includes a mapping system 100 that is implemented to perform methods and other functions as disclosed herein relating to improving mapping through synthesizing probe data.

FIG. 7 will now be discussed in full detail as an example environment within which the system and methods disclosed herein may operate. In some instances, the vehicle 700 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 700 as manipulated by a user (e.g., human driver). In one or more arrangements, the vehicle 700 can be a manually-controlled vehicle that is configured to operate in only the manual mode.

In one or more arrangements, the vehicle 700 implements some level of automation in order to operate autonomously or semi-autonomously. As used herein, automated control of the vehicle 700 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 700 along a travel route via a computing system to control the vehicle 700 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 700.

With continued reference to the various components illustrated in FIG. 7, the vehicle 700 includes one or more processors 710. In one or more arrangements, the processor(s) 710 can be a primary/centralized processor of the vehicle 700 or may be representative of many distributed processing units. For instance, the processor(s) 710 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 700.

The vehicle 700 can include one or more data stores 715 for storing one or more types of data. The data store 715 can be comprised of volatile and/or non-volatile memory. Examples of memory that may form the data store 715 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 715 is a component of the processor(s) 710. In general, the data store 715 is operatively connected to the processor(s) 710 for use thereby. The term "operatively connected," as used throughout this description, can include direct or indirect connections, including connections without direct physical contact.

In one or more arrangements, the one or more data stores 715 include various data elements to support functions of the vehicle 700, such as semi-autonomous and/or autonomous functions. Thus, the data store 715 may store map data 716 and/or sensor data 719. The map data 716 includes, in at least one approach, maps of one or more geographic areas. In some instances, the map data 716 can include information about roads (e.g., lane and/or road maps), traffic control devices, road markings, structures, features, and/or landmarks in the one or more geographic areas. The map data 716 may be characterized, in at least one approach, as a high-definition (HD) map that provides information for autonomous and/or semi-autonomous functions.

In one or more arrangements, the map data 716 can include one or more terrain maps 717. The terrain map(s) 717 can include information about the ground, terrain, roads, surfaces, and/or other features of one or more geographic areas. The terrain map(s) 717 can include elevation data in the one or more geographic areas. In one or more arrangements, the map data 716 includes one or more static obstacle maps 718. The static obstacle map(s) 718 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 719 is data provided from one or more sensors of the sensor system 720. Thus, the sensor data 719 may include observations of a surrounding environment of the vehicle 700 and/or information about the vehicle 700 itself. In some instances, one or more data stores 715 located onboard the vehicle 700 store at least a portion of the map data 716 and/or the sensor data 719. Alternatively, or in addition, at least a portion of the map data 716 and/or the sensor data 719 can be located in one or more data stores 715 that are located remotely from the vehicle 700.

As noted above, the vehicle 700 can include the sensor system 720. The sensor system 720 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 720 and/or the one or more sensors can be operatively connected to the processor(s) 710, the data store(s) 715, and/or another element of the vehicle 700.

Various examples of different types of sensors will be described herein. However, it will be understood that the embodiments are not limited to the particular sensors described. In various configurations, the sensor system 720 includes one or more vehicle sensors 721 and/or one or more environment sensors. The vehicle sensor(s) 721 function to sense information about the vehicle 700 itself. In one or more arrangements, the vehicle sensor(s) 721 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 700.

As noted, the sensor system 720 can include one or more environment sensors 722 that sense a surrounding environment (e.g., external) of the vehicle 700 and/or, in at least one arrangement, an environment of a passenger cabin of the vehicle 700. For example, the one or more environment sensors 722 sense objects the surrounding environment of the vehicle 700. Such obstacles may be stationary objects and/or dynamic objects. Various examples of sensors of the sensor system 720 will be described herein. The example sensors may be part of the one or more environment sensors 722 and/or the one or more vehicle sensors 721. However, it will be understood that the embodiments are not limited to the particular sensors described. As an example, in one or more arrangements, the sensor system 720 includes one or more radar sensors 723, one or more LIDAR sensors 724, one or more sonar sensors 725 (e.g., ultrasonic sensors), and/or one or more cameras 726 (e.g., monocular, stereoscopic, RGB, infrared, etc.).

Continuing with the discussion of elements from FIG. 7, the vehicle 700 can include an input system 730. The input system 730 generally encompasses one or more devices that enable the acquisition of information by a machine from an outside source, such as an operator. The input system 730 can receive an input from a vehicle passenger (e.g., a driver/operator and/or a passenger). Additionally, in at least one configuration, the vehicle 700 includes an output system 735. The output system 735 includes, for example, one or more devices that enable information/data to be provided to external targets (e.g., a person, a vehicle passenger, another vehicle, another electronic device, etc.).

Furthermore, the vehicle 700 includes, in various arrangements, one or more vehicle systems 740. Various examples of the one or more vehicle systems 740 are shown in FIG. 7. However, the vehicle 700 can include a different arrangement of vehicle systems. It should be appreciated that although particular vehicle systems are separately defined, each or any of the systems or portions thereof may be otherwise combined or segregated via hardware and/or software within the vehicle 700. As illustrated, the vehicle

700 includes a propulsion system 741, a braking system 742, a steering system 743, a throttle system 744, a transmission system 745, a signaling system 746, and a navigation system 747.

The navigation system 747 can include one or more devices, applications, and/or combinations thereof to determine the geographic location of the vehicle 700 and/or to determine a travel route for the vehicle 700. The navigation system 747 can include one or more mapping applications to determine a travel route for the vehicle 700 according to, for example, the map data 716. The navigation system 747 may include or at least provide connection to a global positioning system, a local positioning system or a geolocation system.

In one or more configurations, the vehicle systems 740 function cooperatively with other components of the vehicle 700. For example, the processor(s) 710, the mapping system 100, and/or automated driving module(s) 760 can be operatively connected to communicate with the various vehicle systems 740 and/or individual components thereof. For example, the processor(s) 710 and/or the automated driving module(s) 760 can be in communication to send and/or receive information from the various vehicle systems 740 to control the navigation and/or maneuvering of the vehicle 700. The processor(s) 710, the mapping system 100, and/or the automated driving module(s) 760 may control some or all of these vehicle systems 740.

For example, when operating in the autonomous mode, the processor(s) 710, the mapping system 100, and/or the automated driving module(s) 760 control the heading and speed of the vehicle 700. The processor(s) 710, the mapping system 100, and/or the automated driving module(s) 760 cause the vehicle 700 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 700 includes one or more actuators 750 in at least one configuration. The actuators 750 are, for example, elements operable to move and/or control a mechanism, such as one or more of the vehicle systems 740 or components thereof responsive to electronic signals or other inputs from the processor(s) 710 and/or the automated driving module(s) 760. The one or more actuators 750 may include motors, pneumatic actuators, hydraulic pistons, relays, solenoids, piezoelectric actuators, and/or another form of actuator that generates the desired control.

As described previously, the vehicle 700 can include one or more modules, at least some of which are described herein. In at least one arrangement, the modules are implemented as non-transitory computer-readable instructions that, when executed by the processor 710, implement one or more of the various functions described herein. In various arrangements, one or more of the modules are a component of the processor(s) 710, or one or more of the modules are executed on and/or distributed among other processing systems to which the processor(s) 710 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 700 may include one or more automated driving modules 760. The automated driving module(s) 760, in at least one approach, receive data from the sensor system 720 and/or other systems associated with the vehicle 700. In one or more arrangements, the automated driving module(s) 760 use such data to perceive a surrounding environment of the vehicle. The automated driving module(s) 760 determine a position of the vehicle 700 in the surrounding environment and map aspects of the surrounding environment. For example, the automated driving module(s) 760 determines the location of obstacles or other environmental features including traffic signs, trees, shrubs, neighboring vehicles, pedestrians, etc.

The automated driving module(s) 760 either independently or in combination with the mapping system 100 can be configured to determine travel path(s), current autonomous driving maneuvers for the vehicle 700, future autonomous driving maneuvers and/or modifications to current autonomous driving maneuvers based on data acquired by the sensor system 720 and/or another source. In general, the automated driving module(s) 760 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. The phrase "computer-readable storage medium" means a non-transitory storage medium. A computer-readable storage medium may be, for example, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system or device.

Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A mapping system for synthesizing probe vehicle trace data, comprising:

one or more processors;

a memory communicably coupled to the one or more processors and storing instructions that, when executed by the one or more processors, cause the one or more processors to:

acquire imaging data that is overhead images about a roadway without ground-based data or ground-truth data, the imaging data being from a remote source;

encode the imaging data using a probe model to generate features;

generate, from the features using the probe model, probe data that is synthetic and complements the imaging data for the roadway by synthesizing the probe data from the features to imitate a vehicle trace and detections of a virtual vehicle traveling along the roadway, wherein the probe data is comprised of the vehicle trace that is generated with discrete frames imitating points along the roadway at which the virtual vehicle collects sensor data about the roadway and defining discretized locations and associated detections at each of the discretized locations, the detections are derived perceptions from the sensor data about attributes of the roadway; and provide the probe data that includes the vehicle trace and the detections, including instructions to generate a map of the roadway from the probe data and at least semi-autonomously controlling a vehicle using the map.

2. The mapping system of claim 1, wherein the overhead images include satellite images of the roadway.

3. The mapping system of claim 1, wherein the features are abstract representations of the attributes of the roadway, wherein the attributes include lane boundaries, road boundaries, and road markings.

4. The mapping system of claim 1, wherein the probe model is a generative neural network that synthesizes the probe data from the imaging data, and wherein the imaging data further includes information from at least one of a radar and a LiDAR.

5. The mapping system of claim 1, wherein the instructions further include instructions to pre-process the imaging data by validating that the imaging data is up-to-date and fusing, when available, sparse probe data captured via a probe vehicle of the roadway with the imaging data.

6. The mapping system of claim 1, wherein the instructions further include instructions to validate existing map data by using the probe data generated from the imaging data, including at least comparing the probe data with prior data that includes traces previously acquired from vehicles traversing the roadway.

7. The mapping system of claim 6, wherein the instructions to validate the existing map include instructions to detect changes within a map when the probe data does not match the existing map data.

8. A non-transitory computer-readable medium including instructions that, when executed by one or more processors, cause the one or more processors to:

acquire imaging data that is overhead images about a roadway without ground-based data or ground-truth data, the imaging data being from a remote source;

encode the imaging data using a probe model to generate features;

generate, from the features using the probe model, probe data that is synthetic and complements the imaging data for the roadway by synthesizing the probe data from the features to imitate a vehicle trace and detections of a virtual vehicle traveling along the roadway, wherein the probe data is comprised of the vehicle trace that is generated with discrete frames imitating points along the roadway at which the virtual vehicle collects sensor data about the roadway and defining discretized locations and associated detections at each of the discretized locations, the detections are derived perceptions from the sensor data about attributes of the roadway; and provide the probe data that includes the vehicle trace and the detections, including instructions to generate a map of the roadway from the probe data and at least semi-autonomously controlling a vehicle using the map.

9. The non-transitory computer-readable medium of claim 8, wherein the overhead images includes satellite images of the roadway.

10. The non-transitory computer-readable medium of claim 8, wherein the features are abstract representations of the attributes of the roadway, wherein the detections are of the attributes that include lane boundaries, road boundaries, and road markings.

11. The non-transitory computer-readable medium of claim 8, wherein the probe model is a generative neural network that synthesizes the probe data from the imaging data, and wherein the imaging data further includes information from at least one of a radar and a LiDAR.

12. The non-transitory computer-readable medium of claim 8, wherein the instructions further include instructions to validate existing map data by using the probe data generated from the imaging data, including at least comparing the probe data with prior data that includes traces previously acquired from vehicles traversing the roadway.

13. A method, comprising:

acquiring imaging data that is overhead images about a roadway without ground-based data or ground-truth data, the imaging data being from a remote source;

encoding the imaging data using a probe model to generate features;

generating, from the features using the probe model, probe data that is synthetic and complements the imaging data for the roadway by synthesizing the probe data from the features to imitate a vehicle trace and detections of a virtual vehicle traveling along the roadway, wherein the probe data is comprised of the vehicle trace that is generated with discrete frames imitating points along the roadway at which the virtual vehicle collects sensor data about the roadway and defining discretized locations and associated detections at each of the discretized locations, the detections are derived perceptions from the sensor data about attributes of the roadway; and providing the probe data that includes the vehicle trace and the detections, including generating a map of the roadway from the probe data and at least semi-autonomously controlling a vehicle using the map.

14. The method of claim 13, wherein the overhead images includes satellite images of the roadway, and wherein generating the probe data includes synthesizing the probe data as virtual data by the probe model.

15. The method of claim 13, wherein the features are abstract representations of the attributes of the roadway as encoded according to the probe model that is a machine-learning model, wherein the detections are of the attributes that include lane boundaries, road boundaries, and road markings.

16. The method of claim 13, further comprising:

pre-processing the imaging data by validating that the imaging data is up-to-date and fusing, when available, sparse probe data captured via a probe vehicle of the roadway with the imaging data.

17. The method of claim 13, wherein the probe model is a generative neural network that synthesizes the probe data from the imaging data as a virtual imitation of real probe data, and wherein the imaging data further includes information from at least one of a radar and a LiDAR.

18. The method of claim 13, further comprising:

validating existing map data by using the probe data generated from the imaging data, including at least comparing the probe data with prior data that includes traces previously acquired from vehicles traversing the roadway.

* * * * *